(12) United States Patent
Subbarao (10) Patent No.: US 12,216,541 B2
(45) Date of Patent: *Feb. 4, 2025

(54) BLOCK FAILURE PROTECTION FOR ZONE MEMORY SYSTEM

(71) Applicant: Micron Technology, Inc., Boise, ID (US)

(72) Inventor: Sanjay Subbarao, Irvine, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 18/406,894

(22) Filed: Jan. 8, 2024

(65) Prior Publication Data

US 2024/0152424 A1 May 9, 2024

Related U.S. Application Data

(63) Continuation of application No. 17/823,365, filed on Aug. 30, 2022, now Pat. No. 11,914,471.

(51) Int. Cl.
| | |
|---|---|
| H04L 1/00 | (2006.01) |
| G06F 11/07 | (2006.01) |
| G06F 11/10 | (2006.01) |
| G06F 11/14 | (2006.01) |
| H03M 13/00 | (2006.01) |
| H03M 13/11 | (2006.01) |
| H03M 13/13 | (2006.01) |
| H04L 1/18 | (2023.01) |
| H04L 1/1812 | (2023.01) |
| H04L 1/1867 | (2023.01) |

(52) U.S. Cl.
CPC ...... *G06F 11/1068* (2013.01); *G06F 11/0793* (2013.01); *G06F 11/1435* (2013.01)

(58) Field of Classification Search
CPC ............. G06F 11/1068; G06F 11/0793; G06F 11/1435
See application file for complete search history.

(56) References Cited

U.S. PATENT DOCUMENTS

| | | | |
|---|---|---|---|
| 5,506,979 | A | 4/1996 | Menon |
| 5,878,202 | A | 3/1999 | Sakuma |
| 7,984,259 | B1 | 7/2011 | English |
| 8,082,330 | B1 | 12/2011 | Castelli et al. |
| 8,793,223 | B1 | 7/2014 | Cho et al. |
| 10,242,014 | B2 | 3/2019 | Jain et al. |
| 11,914,471 | B1* | 2/2024 | Subbarao ............ G06F 11/1435 |
| 2020/0133576 | A1 | 4/2020 | Gong et al. |
| 2021/0311652 | A1 | 10/2021 | Wang et al. |

* cited by examiner

*Primary Examiner* — Guy J Lamarre
(74) *Attorney, Agent, or Firm* — Schwegman Lundberg & Woessner, P.A.

(57) ABSTRACT

Various embodiments provide block failure protection for a memory sub-system that supports zones, such a memory sub-system that uses a RAIN (redundant array of independent NAND-type flash memory devices) technique for data error-correction. For some embodiments, non-parity zones of a memory sub-system that are filling up at a similar rate are matched together, a parity is generated for stored data from across the matching zones, and the generated parity is stored in a parity zone of the memory device.

20 Claims, 7 Drawing Sheets

BLOCK FAILURE PROTECTION FOR ZONE MEMORY SYSTEM

PRIORITY APPLICATION

This application is a continuation of U.S. application Ser. No. 17/823,365, filed Aug. 30, 2022, which is incorporated herein by reference in its entirety.

TECHNICAL FIELD

Embodiments of the disclosure relate generally to memory devices and, more specifically, to block failure protection for a memory system or sub-system that supports zones.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to block failure protection for a memory sub-system that supports zones (hereafter, a zone memory sub-system), such a memory sub-system that uses a RAIN (redundant array of independent NAND-type flash memory devices) technique for data error-correction. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write command, read command) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request, is hereinafter referred to as "host data" or "user data."

Conventional memory sub-systems can employ error-correction techniques, such as using a redundant array of independent NAND-type flash memory devices (hereafter, referred to as a RAIN technique), to protect data (e.g., host or user data) stored on the memory sub-systems. Error-correction techniques can comprise calculating parity (e.g., exclusive OR (XOR) parity) across some collection of data (e.g., host/user data) being error-protected. By such error-correction techniques, if a data member of the collection is lost (e.g., corrupted) for any reason, the parity calculation can be re-performed and the lost data recreated. As error-correction techniques, such as RAIN techniques, get more complex, so can the number of parallel parity calculations performed to achieve the error-correction protection and the memory resources needed to perform the parallel parity calculations. For example, when the set of memory components comprise multi-plane NAND devices, such as triple-level cell (TLC) NAND devices, multiple (e.g., dozens of) parity calculations may need to be performed in parallel to implement data protection (e.g., for host/user data) stored on the memory sub-system. Data in such conventional memory sub-systems is usually written sequentially across multiple dice of the NAND memory devices. When the data is completely written across a given row of blocks of a specified set of dice of the memory devices, the RAIN parity calculation is performed and stored in a parity block associated with the given row.

The data can be stored in the memory sub-system according to zones (ZNS). Such a memory sub-system can be referred to as a zone-based memory sub-system or a zone memory sub-system. Various zones can be defined in the memory sub-system, each of which can be uniquely associated with a particular set of user data or an application. For example, a first zone can be associated with a first application (or user data identified as received from the first application) and a second zone can be associated with a second application. Host data or user data received from the first application can be stored by the memory sub-system in the first zone. The zones can be of equal or unequal size and can span the size of a single block on a die, multiple blocks on the die, an entire die or a set of dies of the memory sub-system. For example, each zone can span a respective set of blocks in a corresponding die or set of die rather than sequentially across a row of blocks, and a particular application can be associated with a given zone that spans a single die. User or host data associated with that application can be stored in that given zone on the single die. A zone can be defined in a memory sub-system in accordance with a NVM Express (NVMe) specification. For instance, a zone can be defined in a memory sub-system by one or more NVMe commands issued to the memory sub-system. According to conventional approaches, a RAIN parity can be generated when an entire row associated with multiple zones across a specified set of dice is written to.

A host request can include logical address information (e.g., logical block address (LBA), namespace) for the host data, which is the location the host system associates with the host data and a particular zone in which to store or access the host data. The logical address information (e.g., LBA, namespace) can be part of metadata for the host data. Metadata can also include error handling data (e.g., error-correcting code (ECC) code word, parity code), data version (e.g., used to distinguish age of data written), valid bitmap (which LBAs or logical transfer units contain valid data), and so forth.

The memory sub-system can initiate media management operations, such as a write operation, on host data that is stored on a memory device. For example, firmware of the memory sub-system may re-write previously written host data from a location of a memory device to a new location as part of garbage collection management operations. The data that is re-written, for example as initiated by the firmware, is hereinafter referred to as "garbage collection data."

"User data" hereinafter generally refers to host data and garbage collection data. "System data" hereinafter refers to data that is created and/or maintained by the memory sub-system for performing operations in response to host requests and for media management. Examples of system data include, and are not limited to, system tables (e.g., logical-to-physical memory address mapping table (also referred to herein as a L2P table), data from logging, scratch pad data, and so forth).

A memory device can be a non-volatile memory device. A non-volatile memory device is a package of one or more die. Each die can be comprised of one or more planes. For some types of non-volatile memory devices (e.g., AND-type devices), each plane is comprised of a set of physical blocks. For some memory devices, blocks are the smallest area that can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are a raw memory device combined with a local embedded controller for memory management within the same memory device package. The memory device can be divided into one or more zones where each zone is associated with a different set of host data or user data or application.

Certain memory devices, such as NAND-type memory devices, comprise one or more blocks, (e.g., multiple blocks), with each of those blocks comprising multiple memory cells. For instance, a memory device can comprise multiple pages (also referred as wordlines), with each page comprising a subset of memory cells of the memory device. A threshold voltage (VT) of a memory cell (of a block) can be the voltage at which the floating gate (e.g., NAND transistor), implementing the memory cell, turns on and conducts (e.g., to a bit line coupled to the memory cell). Generally, writing data to such memory devices involves programming (by way of a program operation) the memory devices at the page level of a block, and erasing data from such memory devices involves erasing the memory devices at the block level (e.g., page level erasure of data is not possible).

A memory device can comprise one or more cache blocks and one or more non-cache blocks, where data written to the memory device is first written to one or more cache blocks, which can facilitate faster write performance; and data stored on the cache blocks can eventually be moved (e.g., copied) to one or more non-cache blocks at another time (e.g., a time when the memory device is idle), which can facilitate higher storage capacity on the memory device. A cache block can comprise a single-level cell (SLC) block that comprises multiple SLCs, and a non-cache block can comprise a multiple-layer cell (MLC) block that comprises multiple MLCs, a TLC block that comprises multiple TLCs, or a quad-level cell (QLC) block that comprises QLCs. Writing first to one or more SLCs blocks can be referred to as SLC write caching or SLC caching (also referred to as buffering in SLC mode). Generally, when using traditional full SLC caching, an SLC block is released of data after data is moved from the SLC block to a non-cache block (e.g., QLC block) and the non-cache block is verified to be free of errors.

Conventional zone memory sub-systems can use full SLC-block caching (also referred to as SLC caching), where data is buffered (e.g., written first) on SLC cache blocks and the buffered data is released from the SLC cache block after non-cache blocks (e.g., MLC, TLC, QLC blocks) are verified to be free of defects. Unfortunately, in some implementations where the non-cache blocks are QLC blocks, four SLC blocks would be utilized per an open QLC block, which can be quite expensive in resources. For instance, where a memory sub-system has sixteen open QLC blocks per NAND-device plane, sixty-four SLC cache blocks would be used per a plane. This can represent a high overprovisioning (OP) overhead (e.g., 10.5% overprovisioning). Additionally, to achieve smoother transition of SLC cache blocks as a single QLC block is closed and another is opened, even more overprovisioning can be used (e.g., 1% additional overprovisioning). High overprovisioning can render a memory sub-system less competitive to other traditional memory sub-systems.

Various embodiments described herein provide block failure protection for a memory system or sub-system that supports zones. In particular, protects against block failure during block programming, such as programming of a multiple-level cell (MLC), a triple-level cell (TLC), or a quad-level cell (QLC) block. For some embodiments, non-parity zones (e.g., used to store non-parity data, such as user data) of a memory sub-system that are filling up at a similar rate are matched together, a parity is generated (e.g., calculated) for a stripe of data (e.g., pages) from across the matching zones, and the generated parity is stored in a parity zone of the memory device. For instance, the memory sub-system can use a RAIN technique for error-correction, and the generated parity can comprise RAIN parity data. In various embodiments, matching non-parity zones are identified by a zone binning algorithm as described herein. Each zone can comprise one or more blocks of a memory device. For instance, each parity zone can comprise one or more single-level cell (SLC) blocks, and each non-parity zone can comprise one or more non-SLC blocks, such as MLC, TLC, or QLC blocks.

Upon detecting a block or zone failure (e.g., due to a defect during block programming), a block recovery process can be performed to recover data pages of the failed block or zone. For some embodiments, the block recovery process comprises determining (e.g., identifying) one or more parity zones, zone offsets, and data pages that correspond to the data pages to be recovered. Using parity zone metadata, a set of non-parity zones associated with each parity zone can be identified. Thereafter, for each non-parity zone, all zone data at the zone offsets, except the failed block or zone data are exclusive OR'd (XOR'd) together and the result is XOR'd with parity zone data to obtain recovered data corresponding to the failed block or zone.

Use of various embodiments described herein can enable failure protection of programming non-cache blocks (e.g., QLC blocks of non-parity zones), while using less cache blocks (e.g., SLC blocks of parity zones) per a non-cache block. For instance, a zone memory sub-system of an embodiment can achieve block failure protection during programming of QLC blocks, where 1.35 SLC blocks are used per an open QLC block. This can represent a significant reduction in use (e.g., overprovisioning) of SLC blocks in comparison to traditional memory sub-systems that use full SLC caching (e.g., which can use four SLC blocks per an open QLC block).

As used herein, a physical memory location of a memory die can comprise a block, a page, or a memory cell. For instance, where a physical memory location comprises a page or a memory cell, a set of physical memory locations can represent a single block or multiple blocks. The set of physical memory locations can be a set of contiguous physical memory locations. As used herein, storing data on one or more physical memory locations of a memory die can comprise writing data to the one or more physical memory locations, where the writing can comprise programming one or more pages of a block with the data.

Disclosed herein are some examples of block failure protection for a memory sub-system that supports zones, as described herein.

Figure 1:
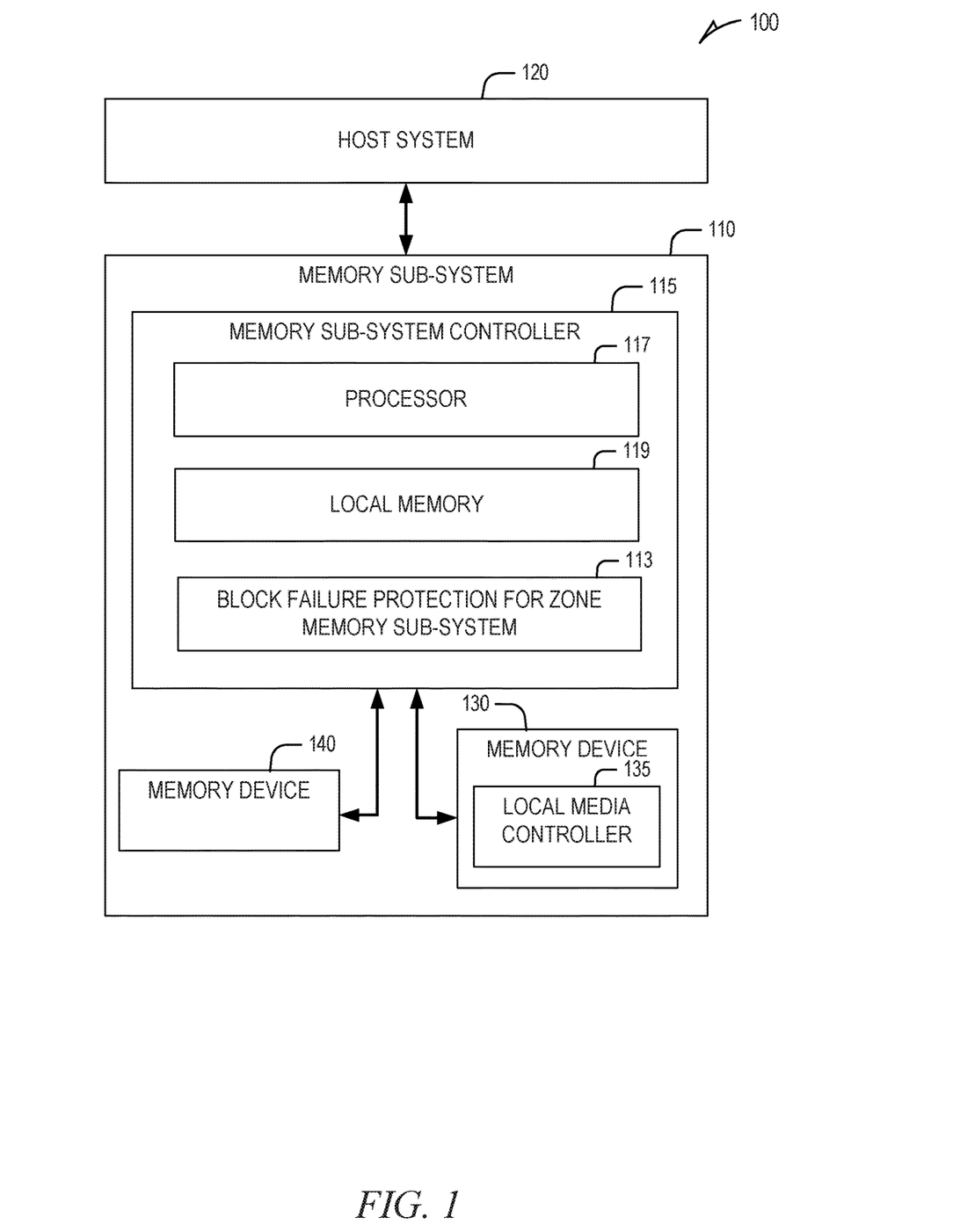
FIG. 1 is a block diagram illustrating an example computing system that includes a memory sub-system, in accordance with some embodiments of the present disclosure.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a SATA interface, a peripheral component interconnect express (PCIe) interface, USB interface, Fibre Channel, Serial Attached SCSI (SAS), Small Computer System Interface (SCSI), a double data rate (DDR) memory bus, a DIMM interface (e.g., DIMM socket interface that supports DDR), Open NAND Flash Interface (ONFI), DDR, Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a NAND type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional (2D) NAND and 3D NAND.

Each of the memory devices 130 can include one or more arrays of memory cells. One type of memory cell, for example, SLCs, can store one bit per cell. Other types of memory cells, such as MLCs, TLCs, QLCs, and penta-level cells (PLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks. As used herein, a block comprising SLCs can be referred to as a SLC block, a block comprising MLCs can be referred to as a MLC block, a block comprising TLCs can be referred to as a TLC block, and a block comprising QLCs can be referred to as a QLC block.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and ECC operations, encryption operations, caching operations, and address translations between a logical address (e.g., LBA, namespace) and a physical memory address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

The memory sub-system controller 115 includes a block failure protection for zone memory sub-system 113 (hereafter, the block failure protection 113) that enables or facilitates the memory sub-system controller 115 to implement block failure protection for zones of the memory sub-system 110 in accordance with various embodiments described herein. Alternatively, some or all of the block failure protection 113 is included by the local media controller 135, thereby enabling the local media controller 135 to enable or facilitate block failure protection across zones of the memory sub-system 110. According to some embodiments, each zone defined on the memory sub-system 110 comprises one or more blocks of the memory devices 130, 140. Each individual zone can have a parity cursor that indicates how much of space from a beginning of the individual zone is protected by parity data (e.g., RAIN parity data), and each individual zone can have a write cursor that indicates the last location in the individual zone where data was last written. For example, a parity cursor of an individual zone can comprise a value that indicates how much space from the beginning of the individual zone is protected by parity data. The value of the parity cursor can be an offset value relative to the beginning of the individual zone. Similarly, a write cursor of the individual zone can comprise a value that indicates the last location in the individual zone where data was last written. The value of the write cursor can be an offset value relative to the beginning of the individual zone. A parity cursor of a given zone can be greater than, less than, or equal to a write cursor of the given zone based on their respective values (e.g., the parity cursor is greater than the write cursor when the value of parity cursor is greater than the value of the write cursor). A parity cursor of a given zone can be updated (e.g., incremented) after parity data for the zone has been generated and stored (e.g., in a parity zone of the memory sub-system 110). A write cursor of a given zone can be updated (e.g., incremented after data is written to available space in the given zone. On the memory sub-system 110, a plurality of zones can be defined such that certain zones (hereafter, non-parity zones) are used to store non-parity data, such as user data, and certain zones (hereafter, parity zones) are used to store parity data generated for data stored in non-parity zones.

After data (e.g., user data) is written to a select zone defined on the memory sub-system 110, the block failure protection for zone memory sub-system 113 can cause the memory sub-system controller 115 to update (e.g., increment value of) the write cursor of the select zone based on the data written to the select zone. The data can be written based on a request from the host system 120 to the memory sub-system 110. After the update, the block failure protection 113 can cause the memory sub-system controller 115 to determine whether the write cursor (as updated) of the select zone is now greater than the parity cursor of the select zone. If so, the block failure protection 113 can cause the memory sub-system controller 115 to scan one or more zones of the memory sub-system 110 to find (e.g., identify) a predetermined number of non-parity zones that respectively have parity cursor with the same value (e.g., non-parity zones with the same amount of space currently protected by parity data) and that respectively have a write cursor that is greater than a parity cursor. Non-parity zones that are part of a member of the same bin candidate set can be considered matching non-parity zones. The predetermined number of non-parity zones sought can vary between different embodiments. For instance, the predetermined number can be 32 or 64. According to various embodiments, parity data (e.g., RAIN parity data) is generated for data from a group of matching non-parity zones that contains a predetermined number (e.g., 32) of non-parity zones, and the generated parity data is stored in a single parity zone having a parity cursor that matches the group's parity cursor. For instance, the parity data can be generated for a data stripe comprising (e.g., constructed from) portions of data from across the matching non-parity zones of the group, where the portions of data are located in the matching non-parity zones relative to the parity cursor of the non-parity zones of the group. Such a data stripe can be referred to herein as a zone stripe. In this way, various embodiments described herein can achieve the predetermined number+1 (e.g., 32+1) RAIN parity data protection of data from the group of non-parity zones.

For some embodiments, the scanning is performed using a zone-binning algorithm described herein. For instance, the zone binning algorithm can involve maintaining bins (e.g., parity cursor bins) that each comprise a candidate set (e.g., list) of non-parity zones and a candidate set (e.g., list) of parity zones having a parity cursor with a value corresponding to the bin's number (e.g., bin number 699 comprises a candidate set of non-parity zones having a parity cursor value of 699 and a candidate set of parity zones having a parity cursor value of 699). A non-parity zone that is member of a bin candidate set can also have a write cursor that is greater than its parity cursor. One or more bins can be updated (e.g., non-parity zones can be moved between candidate sets of non-parity of different bins, or parity zones can be moved between candidate sets of non-parity of different bins) as respective parity cursors are updated (e.g., incremented in value). For example, after error correction parity data is generated for a data stripe of a predetermined number of non-parity zones, parity cursors of those non-parity zones can be updated and, based on the new values of those parity cursors, individual non-parity zones can be moved from its current candidate set of non-parity zones (of one bin) to another candidate set of non-parity zones (of another bin) or can be removed from its current candidate set of non-parity zones in response to the write cursor of the individual non-parity zone equaling the parity cursor of the individual non-parity zone. Additionally, after error correction parity data is stored in a select parity zone, the parity cursor of the select parity zone can be updated and, based on the new value of the parity cursor, the select parity zone can be moved from its current candidate set of parity zones (of a one bin) to another candidate set of parity zones (of another bin).

For some embodiments, number of bins maintained corresponds to the number of possible values a parity cursor can have (e.g., 700 possible parity cursor values would result in 700 bins, such as bins 0 through 699). For some embodiments, the max size of each bin's candidate set of non-parity zones is determined based on the predetermined number of zones being sought (e.g., identified). For instance, where the predetermined number is 32, the max size of each candidate set of non-parity zones can be 32 zones. For some embodiments, the max size of a bin's candidate set of parity zones is determined based on the number of active zones and the predetermined number of zones being sought (e.g., identified). For instance, where the predetermined number is 32 and the number of active zones is 16K, the max size of each bin's candidate set of parity zones can be 512 zones.

Upon finding (e.g., identifying) one or more groups of matching non-parity zones, the block failure protection 113 can cause the memory sub-system controller 115 to generate error correction parity data for at least one of the groups (e.g., each of the groups) found. For a given group of matching non-parity zones, the error correction parity data can be generated based on the parity cursor associated with the given group. For instance, the error correction parity data can be generated for a data stripe (e.g., zone stripe) comprising a portion (e.g., page) of data from the same location of each non-parity zone in the given group, where the location is determined based on (e.g., relative to) a value (e.g., offset value) of the parity cursor associated with the given group. Thereafter, the block failure protection 113 can cause the memory sub-system controller 115 to store the generated parity data to a parity zone having a parity cursor that matches the parity cursor of the given group.

Figure 2:
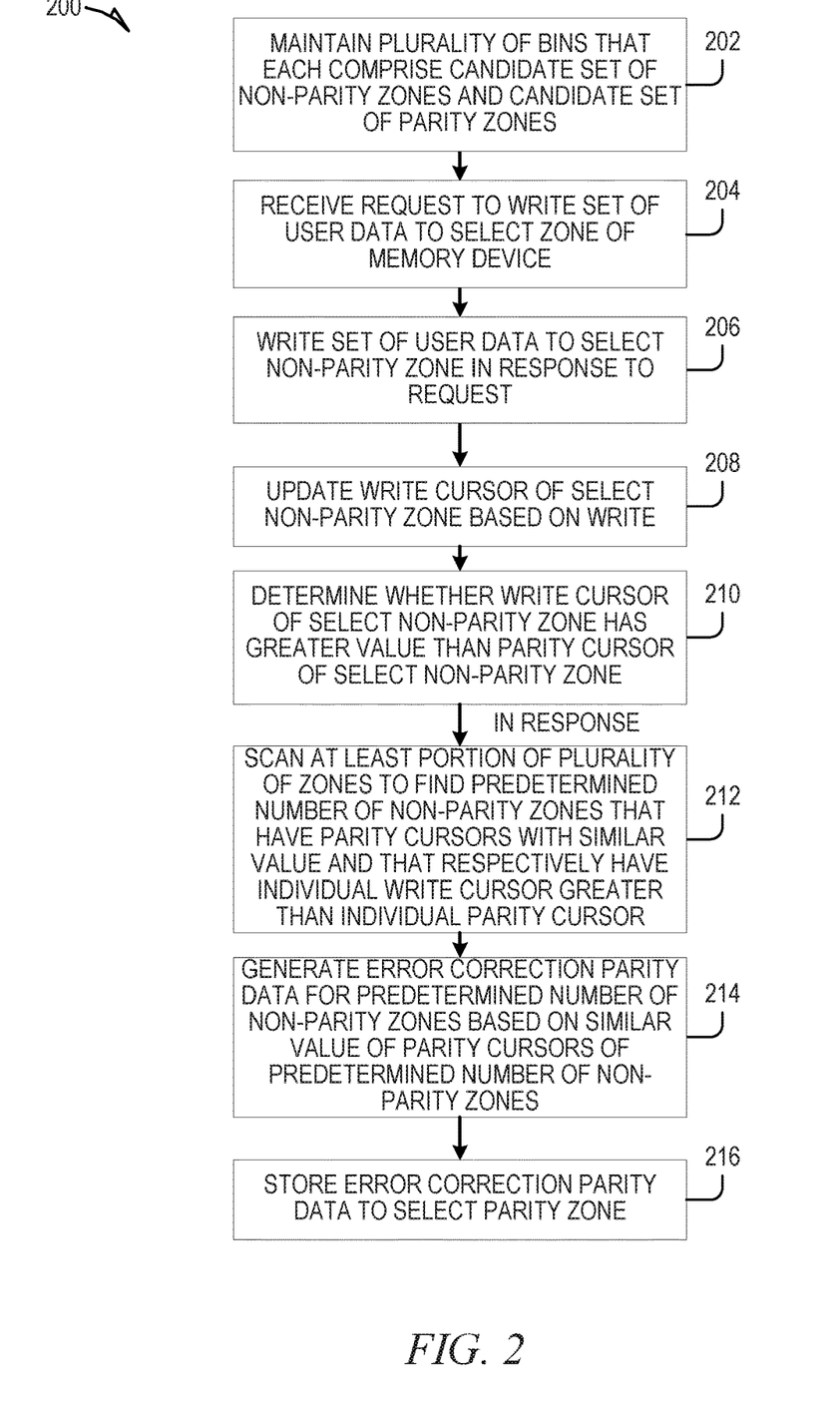
FIG. 2 is a flow diagram of an example method for block failure protection of a memory sub-system that supports zones, in accordance with some embodiments of the present disclosure.

FIG. 2 is a flow diagram of an example method 200 for block failure protection of a memory sub-system that supports zones, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the memory sub-system controller 115 of FIG. 1 based on the block failure protection 113. Additionally, or alternatively, for some embodiments, the method 200 is performed, at least in part, by the local media controller 135 of the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Referring now to the method 200 of FIG. 2, at operation 202 a processing device (e.g., the processor 117 of the memory sub-system controller 115) maintains a plurality of bins that have different (e.g., corresponding) bin numbers, where each individual bin comprises a candidate set of non-parity zones and a candidate set of parity zones. According to various embodiments, the candidate set of non-parity zones of a given bin comprises non-parity zones that have a parity cursor with a value (e.g., matching value) corresponding to a bin number of the given bin and that respectively have a single write cursor that is greater than a single parity cursor. Additionally, for some embodiments, the candidate set of parity zones of a given bin comprises parity zones that have a parity cursor with a value corresponding to the bin number of the individual bin. For some embodiments, the plurality of bins maintained by operation 202 is used for scanning (e.g., at operation 212) at least a portion of the plurality of zones to find a predetermined number of non-parity zones that have parity cursors with a similar value and that respectively have an individual write cursor that is greater than an individual parity cursor. In particular, the plurality of bins can used by a zone-binning algorithm that facilitates scanning of the plurality of zones to find relevant zones. More regarding the zone binning algorithm is described with respect to FIG. 5.

During operation 204, the processing device (e.g., 117) receives a request (e.g., from the host system 120) to write a set of user data to a select non-parity zone of a plurality of zones of a memory device (e.g., 130, 140) of memory sub-system (e.g., 110). For various embodiments, a given zone can be defined with respect to one or more memory devices of the memory sub-system, such as in accordance with a NVM Express (NVMe) standard or specification. The plurality of zones can store data, where the plurality of zones comprises non-parity zones for storing non-parity data, such as user data, and parity zones for storing parity data for the non-parity data. According to various embodiments, each individual zone of the plurality of zones has a parity cursor and a write cursor, where the parity cursor comprises a value (e.g., offset value relative to the beginning of the individual zone) that indicates how much space of the individual zone from a beginning of the individual zone is already parity protected, and where the write cursor comprises a value (e.g., offset value relative to the beginning of the individual zone) that indicates where data was last written to in the individual zone. For some embodiments, the plurality of zones comprises a sub-plurality of parity zones where each parity zone (of the sub-plurality of parity zones) comprises one or more single-level cell (SLC) blocks. Additionally, for some embodiments, the plurality of zones comprises a sub-plurality of non-parity zones where each non-parity zone (of the sub-plurality of non-parity zones) comprises one or more MLC, TLC, or QLC blocks.

In response to the request, at operation 206, the processing device (e.g., 117) writes the set of user data to the select non-parity zone. After writing the set of user data is written to select non-parity zone, at operation 208 the processing device (e.g., 117) update a write cursor of the select non-parity zone based on the writing of the set of user data at operation 206. In particular, the write cursor can be updated (e.g., incremented) to reflect that the set of user data has been written to the select non-parity zone.

Thereafter, at operation 210, the processing device (e.g., 117) determines whether the write cursor of the select non-parity zone has a greater value than that of a parity cursor of the select non-parity zone. In response to the processing device determining that the write cursor of the select non-parity zone does not have a greater value than that of the parity cursor of the select non-parity zone, the processing device does not scan for the predetermined number of non-parity zones.

In response to the processing device determining that the write cursor of the select non-parity zone has a greater value than that of the parity cursor of the select non-parity zone, at operation 212 the processing device (e.g., 117) scans at least a portion of the plurality of zones to find a predetermined number of non-parity zones (e.g., 32 non-parity zones) that have parity cursors with a similar value and that respectively have an individual write cursor that is greater than an individual parity cursor. For some embodiments, non-parity zones found by operation 212 are considered matching non-parity zones. Where a write cursor of an individual zone is greater than a parity cursor of the individual zone, the individual zone is storing data (e.g., user data) that is not protected by parity data (e.g., RAIN parity data). According to some embodiments, the predetermined number of non-parity zones is determined based on the plurality of bins maintained by operation 202. As noted, the plurality of bins can used by a zone binning algorithm that facilitates scanning of the plurality of zones to find relevant zones. For instance, each bin can be checked (e.g., scanned) to identify one or more bins that each have a candidate set of non-parity zones comprising a predetermined number of non-parity zones (e.g., 32 non-parity zones). In accordance with various embodiments, non-parity zones that are members of a candidate set of non-parity zones of given bin are regarded as matching non-parity zones and each have a parity cursor with a similar value, where the value of the parity cursor corresponds to a bin number of the given bin. More regarding the zone binning algorithm is described with respect to FIG. 5.

At operation 214, the processing device (e.g., 117) generates error correction parity data for the predetermined number of non-parity zones based on the value (e.g., matching value) of the parity cursors of the predetermined number of non-parity zones. For some embodiments, the error correction parity data is generated for the predetermined number of non-parity zones for a stripe of data (e.g., pages) across the non-parity zones at a location relative to the parity cursors (e.g., the matching parity cursors) of the predetermined number of non-parity zones. The error correction parity data can represent a partial or temporary parity data for the non-parity zone given that the generated error correction parity data is for only small portion of each non-parity zone. Operation 214 can comprise performing (e.g., initiating) a parity generation operation, such as a RAIN operation, as a background process. For some embodiments, operation 214 comprises performing an exclusive OR (XOR) operation on stored data, from the predetermined number of non-parity zones (e.g., stripe of data from across non-parity zones), at the parity cursors of the predetermined number of non-parity zones.

Subsequently, at operation 216, the processing device (e.g., 117) stores the error correction parity data, generated by operation 214, to a select parity zone of the plurality of zones. In various embodiments, a parity cursor of the select parity zone has a similar value as the parity cursors of the predetermined number of non-parity zones. Accordingly, for some embodiments, the select parity zone is determined (e.g., selected) from the plurality of zones based on a parity cursor of the select parity zone. According to some embodiments, the select parity zone is determined (e.g., selected) based on the plurality of bins maintained by operation 202. For instance, from the plurality of bins, a bin can be determined (e.g., identified) that has a bin number corresponding to a value of the parity cursor of the predetermined number of non-parity zones found (e.g., identified) by operation 212. The select parity zone can then be determined (e.g., selected) from the candidate set of parity zones of the determined (e.g., identified) bin. For some embodiments, operation 216 comprises updating metadata (e.g., parity zone metadata and data stripe metadata) based on storage of the error correction parity data to the select parity zone, where the metadata maps a group of non-parity zones (e.g., the predetermined number of non-parity zones) of the plurality of zones with a parity zone of the plurality of zones. For instance, parity zone metadata can be updated, which maps a non-parity zone (for which error correction parity data was generated at operation 214) of the predetermined number of non-parity zones (found by operation 212) with the select parity zone. Additionally, data stripe metadata can be updated, which maps a data stripe (e.g., zone stripe) constructed from portions of data (e.g., pages of data) obtained from across non-parity zones of the predetermined number of non-parity zones.

Eventually, when a block or zone failure is detected, a block recovery process can be performed to recover data pages of the failed block or zone. For some embodiments, the block recovery process comprises determining (e.g., identifying) one or more parity zones, zone offsets, and data pages that correspond to the data pages to be recovered. Using parity zone metadata, a set of non-parity zones associated with each parity zone can be identified. Thereafter, for each non-parity zone, all zone data at the zone offsets, except the failed block or zone data are exclusive OR'd (XOR'd) together and the result is XOR'd with parity zone data to obtain recovered data corresponding to the failed block or zone.

Figure 3:
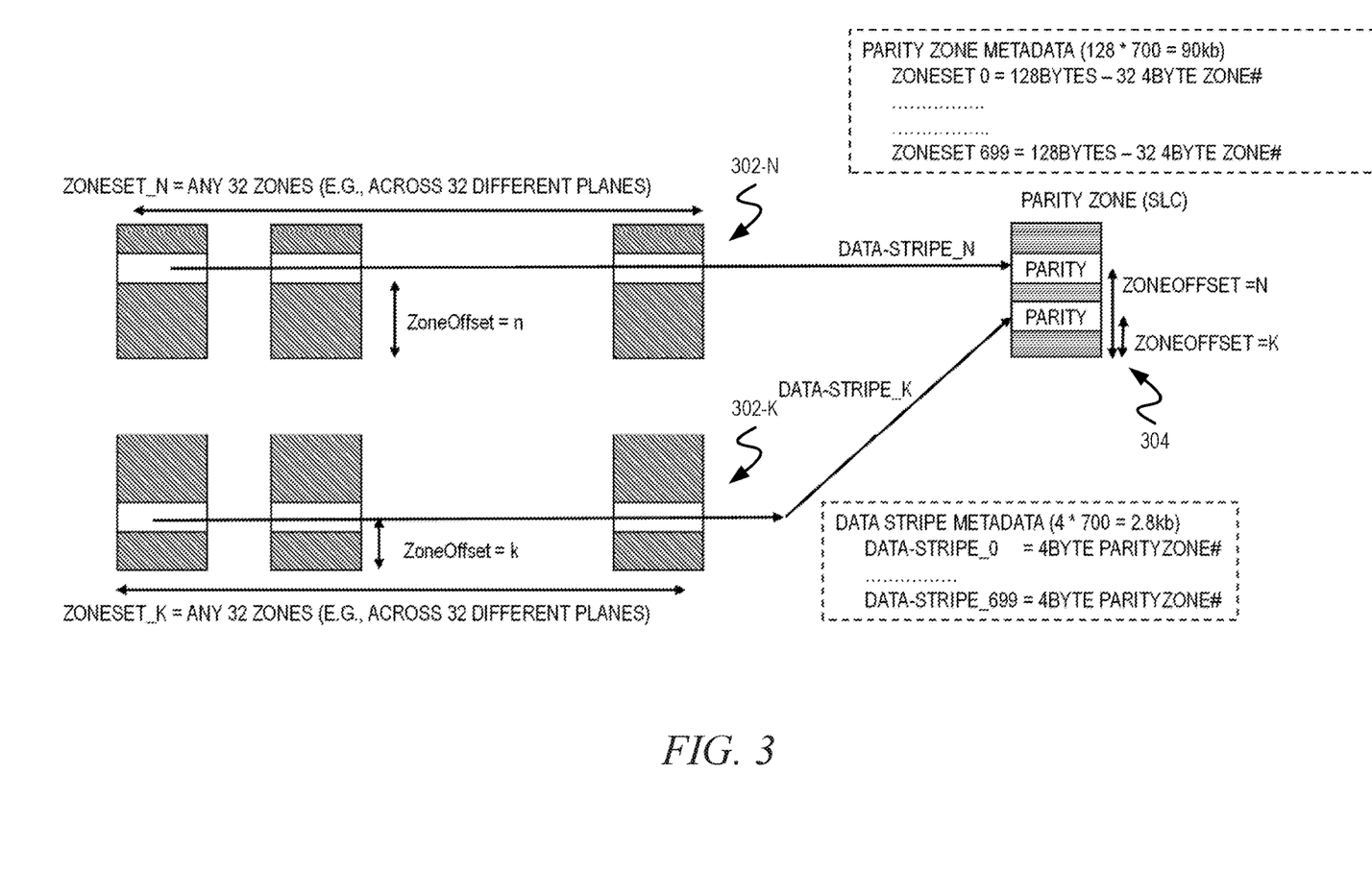
FIGS. 3 and 4 are block diagrams illustrating example block failure protection using data striping on a memory sub-system that supports zones, in accordance with some embodiments of the present disclosure.
Figure 4:
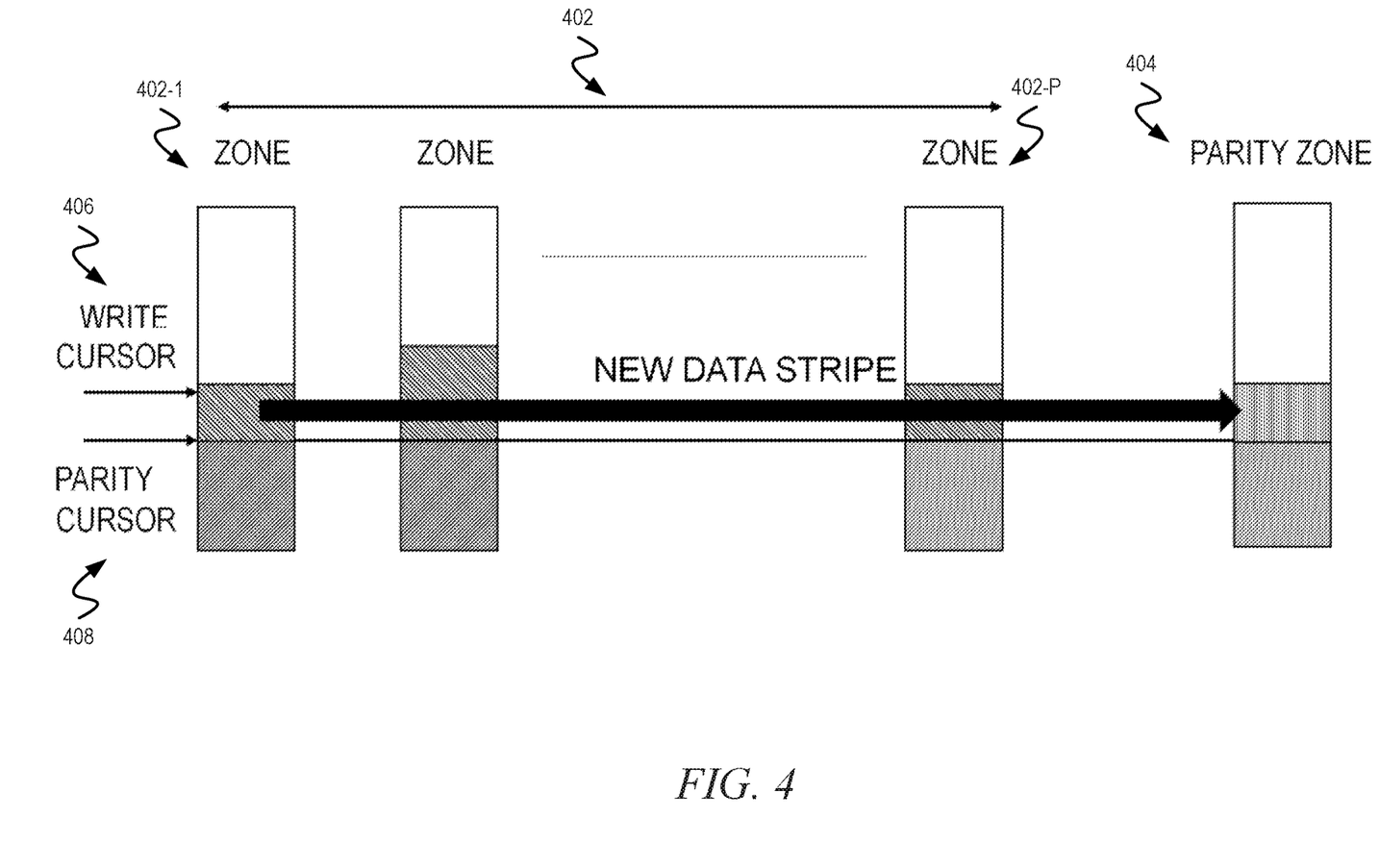

FIGS. 3 and 4 are block diagrams illustrating example block failure protection using data striping on a memory sub-system that supports zones, in accordance with some embodiments of the present disclosure. In particular, FIG. 3 illustrates example zone sets 302-K through 302-N (ZONE-SET_K through ZONESET_N), where each representing an example of 32 matching non-parity zones found by a scanning operation (e.g., operation 212 of the method 200 of FIG. 2). FIG. 3 can represent an example of 32+1 RAIN data protection of a plurality of zones in accordance with various embodiments. For some embodiments, each non-parity zone in a given zone set are disposed on different planes of a memory device. As shown, the parity cursors for the non-parity zones of the zone set 302-K have a zone offset value of K, and the parity cursors for the non-parity zones of the zone set 302-N have a zone offset value of N. When generating error correction parity data for the zone set 302-K, the error correction parity data is generated based on a data stripe K (DATA-STRIPE_K) constructed from a portion of data (e.g., a page of data) from each non-parity zone of the zone set 302-K at a zone offset value of K, which is the value of the parity cursor of the zone set 302-K. The error correction parity data generated for the zone set 302-K is stored in a parity zone 304 (e.g., comprising one or more SLC blocks) at zone offset of K. Likewise, when generating error correction parity data for the zone set 302-N, the error correction parity data is generated based on a data stripe N (DATA-STRIPE_N) constructed from a portion of data from each non-parity zone of the zone set 302-N at a zone offset value of N, which is the value of the parity cursor of the zone set 302-N. The error correction parity data generated for the zone set 302-N is stored in the parity zone at zone offset of N. Assuming that the parity cursor has K through N possible values (e.g., 0 through 699), parity zone metadata can store data regarding (e.g., describing) K through N zone sets, and data stripe metadata can store data regarding (e.g., describing) K through N data stripes.

FIG. 4 illustrates an example of how a new data stripe (e.g., zone stripe) is constructed based on non-parity zones 402-1 through 402-P (collectively referred to as non-parity zones 402), which can represent a predetermined number of non-parity zones (e.g., 32 non-parity zones) that have parity cursors with a similar value, and that respectively have a write cursor that is greater than the parity cursor. As illustrated, the non-parity zone 402-1 has a write cursor 406 that is greater than a parity cursor 408, which indicates that there is a portion of data (e.g., one or more pages of data) stored in the non-parity zone 402-1 that is not protected by error correction parity data. The new data stripe is determined relative to the current value of the parity cursors of the non-parity zones 402 (e.g., value of the parity cursor+1). As also shown, error correction parity data generated for the new data stripe is eventually stored in a parity zone 404, which is a parity zone having a parity cursor that matches that of the non-parity zones 402. The generated error correction parity data can be stored in the parity zone 404 at a location corresponding to the parity cursor of the parity zone 404.

Figure 5:
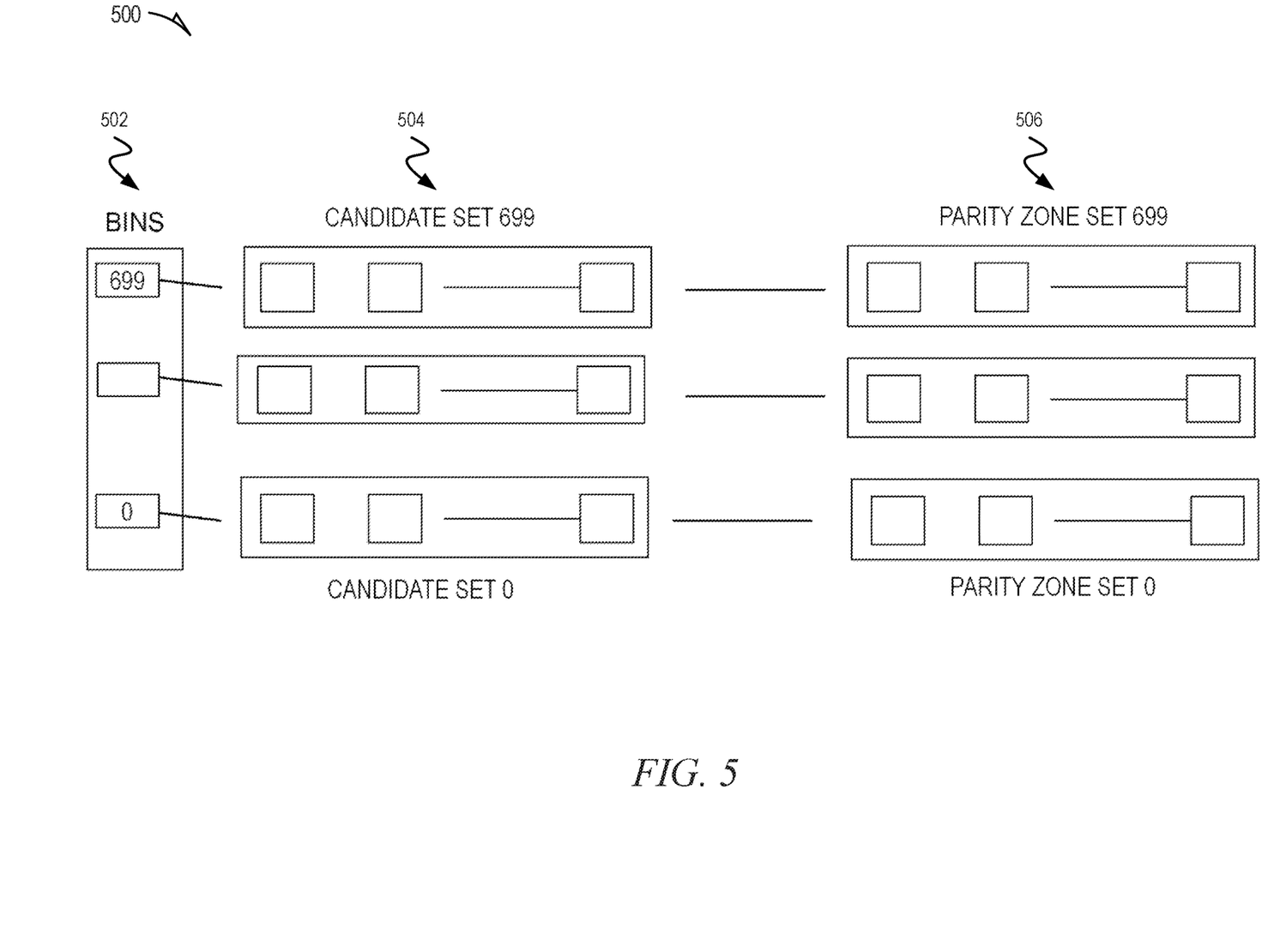
FIG. 5 is a block diagram for an example bin structure used for finding zones, in accordance with some embodiments of the present disclosure.

FIG. 5 is a block diagram for an example bin structure 500 used for finding zones, in accordance with some embodiments of the present disclosure. In particular, the bin structure 500 can be used by a zone-binning algorithm to facilitate scanning for non-parity and parity zones in accordance with various embodiments. In FIG. 5, a parity cursor bin 502 comprises 700 bins that have corresponding bin numbers 0 through 699. As illustrated, each bin comprises (e.g., linked to) a candidate set of non-parity zones (CANDIDATE SET), and a candidate set of parity zones (one of PARITY ZONE SET). Accordingly, CANDIDATE SETS 0 through 699 (candidate sets 504) correspond to bins 0 through 699, and PARITY ZONE SETS 0 through 699 (parity zone sets 506) correspond to bins 0 through 699. For various embodiments, a candidate set comprises a list non-parity zones whose write cursor is greater than its parity cursor, and that have the same value for their parity cursors. Additionally, for some embodiments, a parity zone set comprises a list parity zones that have the same value for their parity cursors. According to various embodiments, each non-parity zone and parity zone starts from bin 0 and makes its way upward (e.g., until bin 699) as parity cursors are updated during operation.

Figure 6:
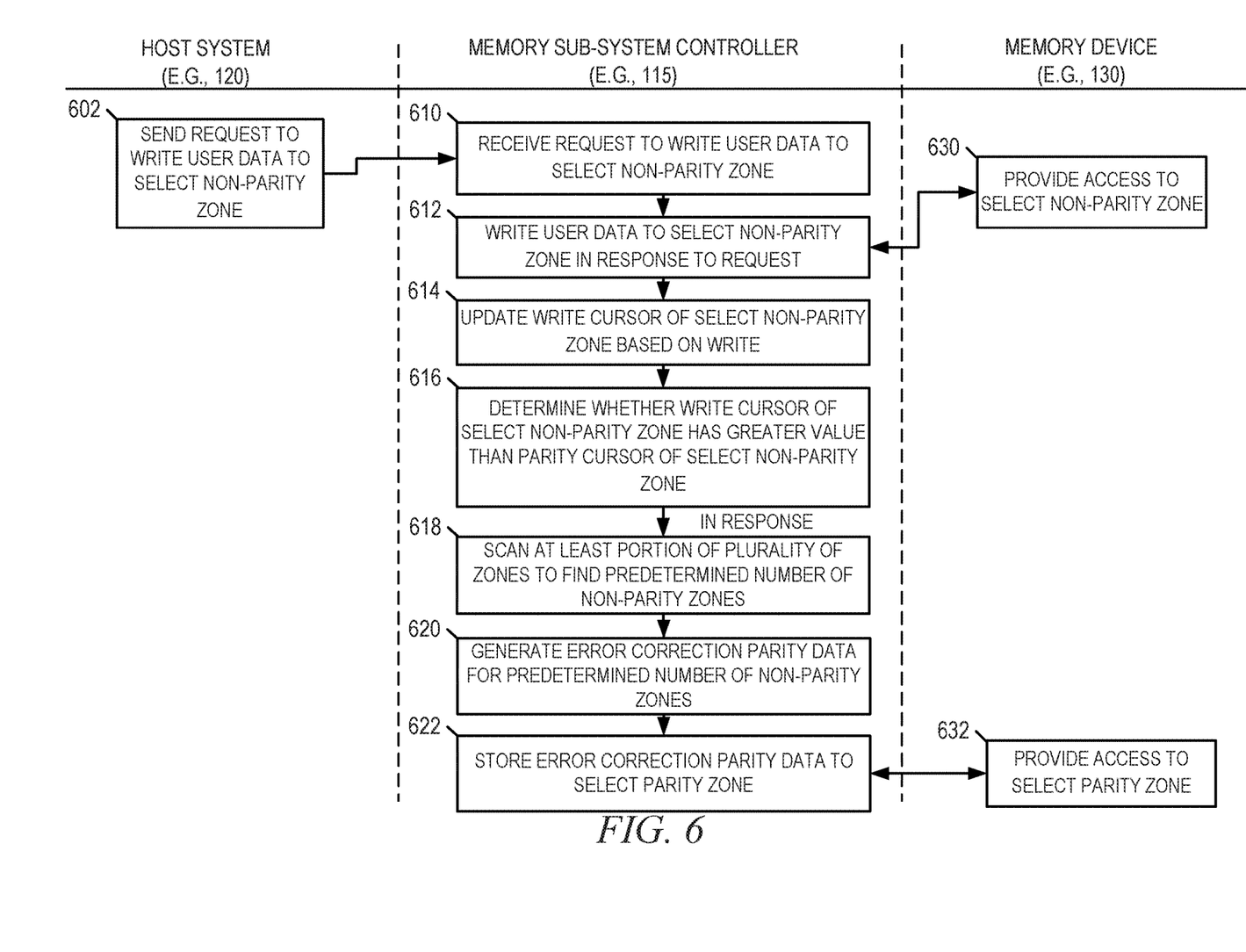
FIG. 6 provides an interaction diagram illustrating interactions between components of a computing environment in the context of some embodiments in which a method for block failure protection of a memory sub-system that supports zones as described herein is performed.

FIG. 6 provides an interaction diagram illustrating interactions between components of a computing environment in the context of some embodiments in which a method for block failure protection of a memory sub-system that supports zones as described herein is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by a host system (e.g., 120), a memory sub-system controller (e.g., 115), a memory device (e.g., 130 or 140), or some combination thereof. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. In the context of the example illustrated in FIG. 6, the host system can include the host system 120, the memory sub-system controller can include the memory sub-system controller 115, and the memory device can include the memory device 130.

As shown in FIG. 6, at operation 602, the host system 120 sends a request to write user data to a select non-parity zone of (e.g., defined on) the memory sub-system 110 and, at operation 610, the memory sub-system controller 115 receives the request from the host system 120.

At operation 612, the memory sub-system controller 115 writes the user data to the select non-parity zone. To facilitate this, at operation 630, the memory device 130 provides access to portions of the memory device 130 associated with (e.g., corresponding to) portions of the select non-parity zone to which the user data is being written. Additionally, at operation 614, the memory sub-system controller 115 updates a write cursor of the select non-parity zone based on the writing of the user data at operation 612.

Thereafter, at operation 616, the memory sub-system controller 115 determines whether the write cursor of the select non-parity zone has a greater value than that of a parity cursor of the select non-parity zone. In response to the memory sub-system controller 115 determining that the write cursor of the select non-parity zone has a greater value than that of the parity cursor of the select non-parity zone, at operation 618, the memory sub-system controller 115 scans at least a portion of the plurality of zones to find a predetermined number of non-parity zones (e.g., 32 non-parity zones) that have parity cursors with a similar value and that respectively have an individual write cursor that is greater than an individual parity cursor. Subsequently, at operation 620, the memory sub-system controller 115 generates error correction parity data for the predetermined number of non-parity zones based on the value of the parity cursors of the predetermined number of non-parity zones. At operation 622, the memory sub-system controller 115 stores the error correction parity data, generated by operation 620, to a select parity zone of the plurality of zones. To facilitate this, at operation 632, the memory device 130 provides access to portions of the memory device 130 associated with (e.g., corresponding to) portions of the select parity zone to which the error correction parity data is being written.

Figure 7:
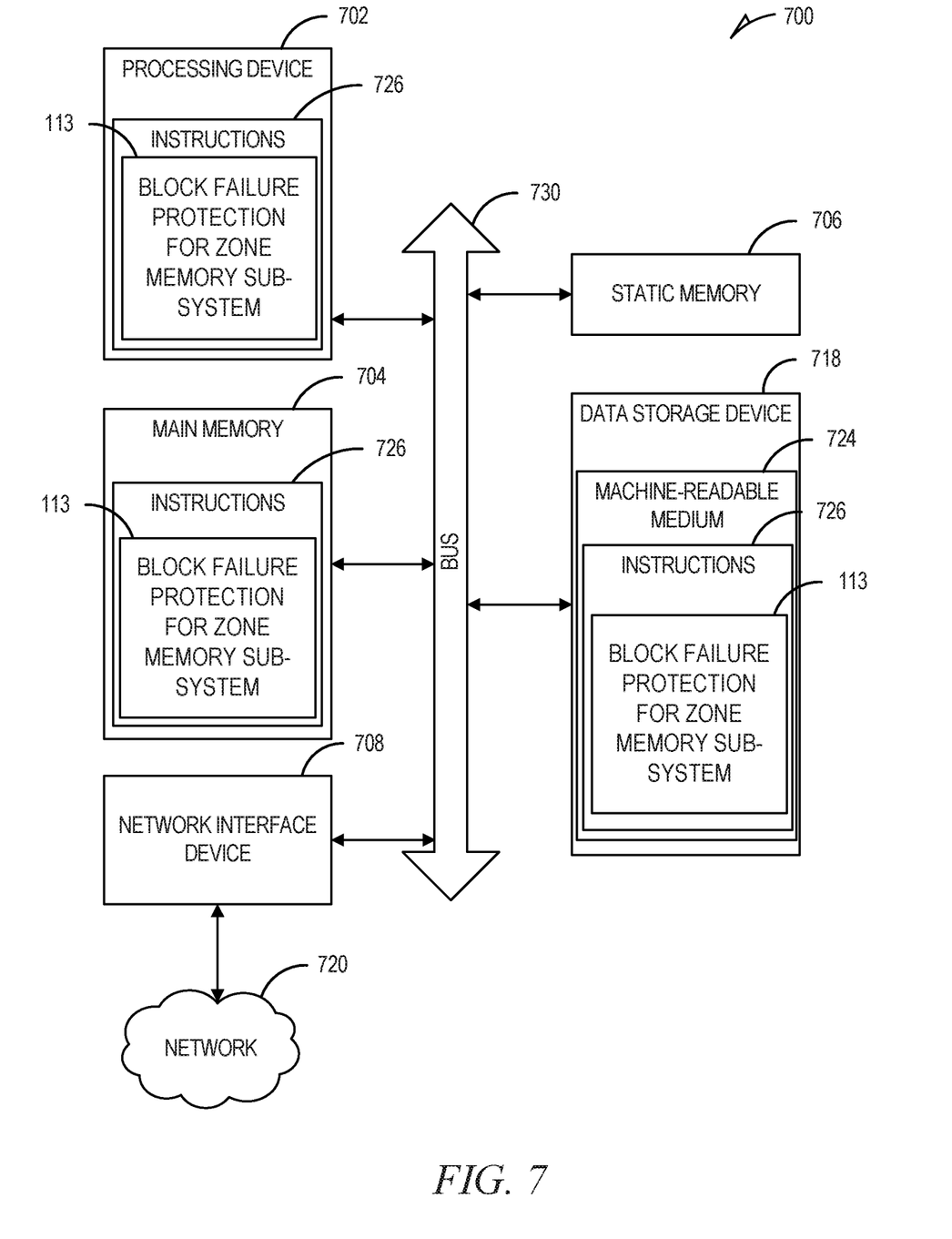
FIG. 7 is a block diagram of an example computer system in which embodiments of the present disclosure may operate.

FIG. 7 illustrates an example machine in the form of a computer system 700 within which a set of instructions can be executed for causing the machine to perform any one or more of the methodologies discussed herein. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., ROM, flash memory, DRAM such as SDRAM or Rambus DRAM (RDRAM), etc.), a static memory 706 (e.g., flash memory, static random access memory (SRAM), etc.), and a data storage device 718, which communicate with each other via a bus 730.

The processing device 702 represents one or more general-purpose processing devices such as a microprocessor, a central processing unit, or the like. More particularly, the processing device 702 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 702 can also be one or more special-purpose processing devices such as an application-specific integrated circuit (ASIC), a field programmable gate array (FPGA), a digital signal processor (DSP), a network processor, or the like. The processing device 702 is configured to execute instructions 726 for performing the operations and steps discussed herein. The computer system 700 can further include a network interface device 708 to communicate over a network 720.

The data storage device 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage device 718, and/or main memory 704 can correspond to the memory sub-system 110 of FIG. 1.

In one embodiment, the instructions 726 include instructions to implement functionality corresponding to providing block failure protection for a zone memory sub-system as described herein (e.g., the block failure protection 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device comprising a plurality of zones for storing data, each zone of the plurality of zones having a parity cursor and a write cursor, a parity cursor of an individual zone comprising a value that indicates how much space of the individual zone from a beginning of the individual zone is already parity protected, a write cursor of the individual zone comprising a value that indicates where data was last written to in the individual zone; and
a processing device, operatively coupled to the memory device, configured to perform operations comprising:
determining whether a write cursor of a select non-parity zone of the plurality of zones has a greater value than that of a parity cursor of the select non-parity zone; and
in response to the write cursor of the select non-parity zone having a greater value than that of the parity cursor of the select non-parity zone:
scanning at least a portion of the plurality of zones to find a predetermined number of non-parity zones that have parity cursors with a similar value and that respectively have an individual write cursor that is greater than an individual parity cursor;
generating error correction parity data for the predetermined number of non-parity zones based on the similar value of the parity cursors of the predetermined number of non-parity zones; and
storing the error correction parity data to a select parity zone of the plurality of zones.

2. The system of claim 1, wherein the operations comprise:
writing a set of user data to the select non-parity zone; and
updating the write cursor of the select non-parity zone based on the writing of the set of user data.

3. The system of claim 1, wherein a parity cursor of the select parity zone has the similar value of the parity cursors of the predetermined number of non-parity zones.

4. The system of claim 3, wherein the operations comprise:
selecting the select parity zone, from a set of parity zones in the plurality of zones, based on a parity cursor of the select parity zone.

5. The system of claim 1, wherein the generating of the error correction parity data for the predetermined number of non-parity zones based on the similar value of the parity cursors of the predetermined number of non-parity zones comprises:
performing an exclusive OR (XOR) operation on stored data, from the predetermined number of non-parity zones, at the parity cursors of the predetermined number of non-parity zones.

6. The system of claim 1, wherein the storing of the error correction parity data to the select parity zone of the plurality of zones comprises:
updating metadata based on storage of the error correction parity data to the select parity zone, the metadata mapping a group of non-parity zones with a parity zone.

7. The system of claim 1, wherein the operations comprise:
maintaining a plurality of bins having different bin numbers, each individual bin of the plurality of bins comprising:
a candidate set of non-parity zones that have a parity cursor with a value corresponding to a bin number of the individual bin and that respectively have a single write cursor that is greater than a single parity cursor; and
a candidate set of parity zones that have a parity cursor with a value corresponding to the bin number of the individual bin, the scanning of the at least a portion of the plurality of zones is based on the plurality of bins.

8. The system of claim 1, wherein the predetermined number of non-parity zones is a first predetermined number of non-parity zones, wherein the similar value is a first similar value, wherein the error correction parity data is first error correction parity data, and wherein the operations comprise:
in response to the scanning of the at least a portion of the plurality of zones not finding the first predetermined number of non-parity zones:
scanning the at least a portion of the plurality of zones to find a second predetermined number of non-parity zones that have parity cursors with a second similar value and that respectively have an individual write cursor that is greater than a threshold value;
generating second error correction parity data for the second predetermined number of non-parity zones based on the second similar value of the parity cursors of the second predetermined number of non-parity zones; and
storing the second error correction parity data to an identified parity zone of the plurality of zones.

9. The system of claim 1, wherein the plurality of zones comprises a sub-plurality of parity zones, each parity zone of the sub-plurality of parity zones comprising one or more single-level cell (SLC) blocks, the sub-plurality of parity zones comprising the select parity zone.

10. The system of claim 1, wherein the select non-parity zone comprises one or more quad-level cell (QLC) blocks.

11. The system of claim 1, wherein the plurality of zones is defined according to a Non-Volatile Memory Express specification.

12. At least one non-transitory machine-readable storage medium comprising instructions that, when executed by a processing device, cause the processing device to perform operations comprising:
determining whether a write cursor of a select non-parity zone has a greater value than that of a parity cursor of the select non-parity zone, the select non-parity zone being part of a plurality of zones of a memory device, each zone of the plurality of zones having a parity cursor and a write cursor, a parity cursor of an individual zone comprising a value that indicates how much space of the individual zone from a beginning of the individual zone is already parity protected, a write cursor of the individual zone comprising a value that indicates where data was last written to in the individual zone; and
in response to the write cursor of the select non-parity zone having a greater value than that of the parity cursor of the select non-parity zone:
scanning at least a portion of the plurality of zones to find a predetermined number of non-parity zones that have parity cursors with a similar value and that respectively have an individual write cursor that is greater than an individual parity cursor;
generating error correction parity data for the predetermined number of non-parity zones based on the similar value of the parity cursors of the predetermined number of non-parity zones; and
storing the error correction parity data to a select parity zone of the plurality of zones.

13. The at least one non-transitory machine-readable storage medium of claim 12, wherein a parity cursor of the select parity zone has the similar value of the parity cursors of the predetermined number of non-parity zones.

14. The at least one non-transitory machine-readable storage medium of claim 13, wherein the operations comprise:
selecting the select parity zone, from a set of parity zones in the plurality of zones, based on a parity cursor of the select parity zone.

15. The at least one non-transitory machine-readable storage medium of claim 12, wherein the generating of the error correction parity data for the predetermined number of non-parity zones based on the similar value of the parity cursors of the predetermined number of non-parity zones comprises:
performing an exclusive OR (XOR) operation on stored data, from the predetermined number of non-parity zones, at the parity cursors of the predetermined number of non-parity zones.

16. The at least one non-transitory machine-readable storage medium of claim 12, wherein the storing of the error correction parity data to the select parity zone of the plurality of zones comprises:
updating metadata based on storage of the error correction parity data to the select parity zone, the metadata mapping a group of non-parity zones with a parity zone.

17. The at least one non-transitory machine-readable storage medium of claim 12, wherein the operations comprise:
maintaining a plurality of bins having different bin numbers, each individual bin of the plurality of bins comprising:
a candidate set of non-parity zones that have a parity cursor with a value corresponding to a bin number of the individual bin and that respectively have a single write cursor that is greater than a single parity cursor; and
a candidate set of parity zones that have a parity cursor with a value corresponding to the bin number of the individual bin, the scanning of the at least a portion of the plurality of zones is based on the plurality of bins.

18. The at least one non-transitory machine-readable storage medium of claim 12, wherein the predetermined number of non-parity zones is a first predetermined number of non-parity zones, wherein the similar value is a first similar value, wherein the error correction parity data is first error correction parity data, and wherein the operations comprise:
in response to the scanning of the at least a portion of the plurality of zones not finding the first predetermined number of non-parity zones:
scanning the at least a portion of the plurality of zones to find a second predetermined number of non-parity zones that have parity cursors with a second similar value and that respectively have an individual write cursor that is greater than a threshold value;
generating second error correction parity data for the second predetermined number of non-parity zones based on the second similar value of the parity cursors of the second predetermined number of non-parity zones; and
storing the second error correction parity data to an identified parity zone of the plurality of zones.

19. The at least one non-transitory machine-readable storage medium of claim 12, wherein the plurality of zones comprises a sub-plurality of parity zones, each parity zone of the sub-plurality of parity zones comprising one or more single-level cell (SLC) blocks, the sub-plurality of parity zones comprising the select parity zone.

20. A method comprising:

determining whether a write cursor of a select non-parity zone has a greater value than that of a parity cursor of the select non-parity zone, the select non-parity zone being part of a plurality of zones of a memory device, each zone of the plurality of zones having a parity cursor and a write cursor, a parity cursor of an individual zone comprising a value that indicates how much space of the individual zone from a beginning of the individual zone is already parity protected, a write cursor of the individual zone comprising a value that indicates where data was last written to in the individual zone; and in response to the write cursor of the select non-parity zone having a greater value than that of the parity cursor of the select non-parity zone:

scanning at least a portion of the plurality of zones to find a predetermined number of non-parity zones that have parity cursors with a similar value and that respectively have an individual write cursor that is greater than an individual parity cursor;

generating error correction parity data for the predetermined number of non-parity zones based on the similar value of the parity cursors of the predetermined number of non-parity zones; and storing the error correction parity data to a select parity zone of the plurality of zones.

* * * * *